United States Patent [19]

Fujiwara et al.

[11] Patent Number: 6,162,413
[45] Date of Patent: *Dec. 19, 2000

[54] ALPHA-ALUMINA AND METHOD FOR PRODUCING SAME

[75] Inventors: Shinji Fujiwara; Hiroshi Tabuchi; Masahide Mohri, all of Ibaraki, Japan

[73] Assignee: Sumitomo Chemical Company, Limited, Osaka, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/925,583

[22] Filed: Sep. 8, 1997

Related U.S. Application Data

[63] Continuation of application No. 08/604,501, Feb. 21, 1996, abandoned.

[30] Foreign Application Priority Data

Feb. 21, 1995 [JP] Japan ................................ 7-032264

[51] Int. Cl.$^7$ .................................................. C01F 7/00
[52] U.S. Cl. ................................................... 423/625
[58] Field of Search ...................... 423/625, 131

[56] References Cited

U.S. PATENT DOCUMENTS

| | | | |
|---|---|---|---|
| 2,961,297 | 11/1960 | Fenerty | 23/142 |
| 3,175,883 | 3/1965 | Lindsay et al. | 23/142 |
| 3,262,754 | 7/1966 | Lindsay et al. | 23/142 |
| 3,384,454 | 5/1968 | Barrington | 23/142 |
| 3,442,606 | 5/1969 | Hrishikesan | 23/142 |
| 3,532,460 | 10/1970 | Snyder | 23/142 |
| 3,615,306 | 10/1971 | Jones et al. | 51/309 |
| 3,950,507 | 4/1976 | Kuklin et al. | 423/626 |
| 3,961,036 | 6/1976 | Hamner et al. | 423/628 |
| 4,019,914 | 4/1977 | Esper et al. | 106/62 |
| 4,130,402 | 12/1978 | Schepers et al. | 51/309 |
| 4,193,768 | 3/1980 | Ohishi et al. | 23/301 |
| 4,308,088 | 12/1981 | Cherdron et al. | 156/603 |
| 4,374,119 | 2/1983 | Schepers et al. | 423/625 |
| 4,379,134 | 4/1983 | Weber et al. | 423/626 |
| 4,477,427 | 10/1984 | Matyasi et al. | 423/628 |
| 4,487,756 | 12/1984 | Mizrah et al. | 423/625 |
| 4,615,875 | 10/1986 | Gonczy et al. | 423/626 |
| 4,699,770 | 10/1987 | Weston | 423/135 |
| 4,744,802 | 5/1988 | Schwabel | 51/309 |
| 4,797,139 | 1/1989 | Bauer et al. | 51/293 |
| 4,822,592 | 4/1989 | Misra | 423/627 |
| 4,847,064 | 7/1989 | Pearson | 426/625 |
| 4,954,462 | 9/1990 | Wood et al. | 501/95 |
| 5,139,978 | 8/1992 | Wood | 501/127 |
| 5,149,520 | 9/1992 | Sucech et al. | 423/625 |
| 5,225,229 | 7/1993 | Martin et al. | 423/629 |
| 5,277,702 | 1/1994 | Thibault et al. | 51/309 |
| 5,296,085 | 3/1994 | Faure et al. | 156/603 |
| 5,296,177 | 3/1994 | The et al. | 264/177 |
| 5,302,368 | 4/1994 | Harato et al. | 423/625 |
| 5,340,781 | 8/1994 | Oda et al. | 501/127 |
| 5,449,389 | 9/1995 | Yoshizumi et al. | 51/308 |

FOREIGN PATENT DOCUMENTS

| | | |
|---|---|---|
| 0105025 | 4/1984 | European Pat. Off. . |
| 0188388 | 7/1986 | European Pat. Off. . |
| 0223493 | 5/1987 | European Pat. Off. . |
| 0224118 | 6/1987 | European Pat. Off. . |
| 0281265 | 9/1988 | European Pat. Off. . |
| 0281265 | 12/1988 | European Pat. Off. . |
| 0277730 | 5/1992 | European Pat. Off. . |
| 644277 | 3/1995 | European Pat. Off. . |
| 1159418 | 12/1963 | Germany . |
| 1767511 | 4/1977 | Germany . |
| 2850064 | 5/1980 | Germany . |
| 59-097528 | 6/1959 | Japan . |
| 47-005744 | 3/1972 | Japan . |
| 47-46274 | 11/1972 | Japan . |
| 48-13832 | 5/1973 | Japan . |
| 54-016398 | 2/1979 | Japan . |
| 48034680 | 5/1979 | Japan . |
| 59-156962 | 9/1984 | Japan . |
| 60-131825 | 7/1985 | Japan . |

(List continued on next page.)

OTHER PUBLICATIONS

Chemical Abstracts, vol. 114, No. 4, Jan. 28, 1991, Columbus, Ohio, U.S.; Abstract No. 28760, Abstract of Khanamirova: Khim. Technol., vol. 5, 1990, Kiev, pp. 26–29.
Database WPI, Section Ch, Week 8714, Derwent Publ. Ltd. AN 98164 Abstract JP 62046922, 1987, no month.
Chemical Abstract No. 46726d, vol. 84, No. 8, Feb. 1976.
62th CATSJ Meeting Abstract No. 2D105, 1988, no month.
Chemical Abstract No. 99:197304a, 1983, no month.
Proc. Light Metals, Feb. 1990, pp. 115–119.
Chemical Abstract No. 104:71187t, 1986, no month.
Chemical Abstract No. 105:117463f, 1986, no month.
Ohigara et al, "Preparation of Monodisperse, Spherical Alumina Powders from Alkoxides," *Journal of the American Ceramic Society*, vol. 74, No. 9, pp. 2263–2269 (1991), no month.
Gitzen, "Alumina as a Ceramic Material," *American Ceramic Society Technical Literature*, pp. 7–28 (1970), no month.
Khanamirova, A.A., et al., "Mechanical activation of aluminum hydroxide in the production of alpha alumina" Khim. Tekhnol. (5), pp. 26–29, May 1990.

*Primary Examiner*—Steven Bos
*Attorney, Agent, or Firm*—Sughrue, Mion, Zinn, Macpeak & Seas, PLLC

[57] ABSTRACT

A powdery α-alumina having an alumina purity of at least 99.8 wt. %, a sodium content of 40 ppm or less and an iron content of 20 ppm or less, which is obtained by grinding aluminum hydroxide which is produced by the Bayer process or a transition alumina which is obtained by precalcining aluminum hydroxide produced by the Bayer process, and calcining the aluminum hydroxide or transition alumina in an atmosphere containing 1 vol. % or more of a hydrogen chloride gas, or an atmosphere containing 1 vol. % or more of a chlorine gas and 0.1 vol. % or more of steam, at a temperature of 600 to 1400° C.

4 Claims, No Drawings

FOREIGN PATENT DOCUMENTS

| | | |
|---|---|---|
| 62-246815 | 10/1987 | Japan . |
| 63-303809 | 12/1988 | Japan . |
| 64-03008 | 1/1989 | Japan . |
| 6433013 | 2/1989 | Japan . |
| 2-167856 | 6/1990 | Japan . |
| 3-131517 | 5/1991 | Japan . |
| 3-294436 | 12/1991 | Japan . |
| 4-198014 | 7/1992 | Japan . |
| 5-030768 | 5/1993 | Japan . |
| 990801 | 5/1965 | United Kingdom . |
| 2108949 | 5/1983 | United Kingdom . |
| WO9015777 | 12/1990 | WIPO . |
| 9324680 | 12/1993 | WIPO . |

ALPHA-ALUMINA AND METHOD FOR PRODUCING SAME

This is a Continuation of application Ser. No. 08/604,501 filed Feb. 21, 1996, now abandoned.

BACKGROUND OF THE INVENTION

1. Field of the Invention

The present invention relates to α-alumina and a method for producing the same.

2. Description of the Related Art

Alpha-alumina is widely used as an abrasive, a raw material of a sintered body or a plasma spray material, and a filler. One of the most commonly used economical methods for producing α-alumina in an industrial scale is a Bayer process. By the Bayer process, bauxite as a raw material is treated with sodium hydroxide to obtain aluminum hydroxide, and then aluminum hydroxide is calcined in an air to obtain α-alumina.

However, aluminum hydroxide obtained by the Bayer process contains a considerable amount of sodium, and almost all sodium remains in α-alumina which is obtained by calcining aluminum hydroxide in the air. When α-alumina is used as an electrical insulating material in a spark plug and the like, the remaining sodium components will interfere the electrical insulating properties.

To solve such problem, some proposals have been made. For example, JP-A-47-5744 discloses a method for removing sodium by wetting aluminum hydroxide with hydrochloric acid or an aqueous solution of aluminum chloride when aluminum hydroxide which is produced by the Bayer process and contains a large amount of sodium is precalcined, and calcining aluminum hydroxide in a furnace with filling wet aluminum hydroxide in a siliceous refractory container.

JP-A-48-34680 discloses a method for calcining aluminum hydroxide or alumina which is obtained by the Bayer process in the presence of hydrochloric acid or aluminum chloride, and boric acid or boron oxide. JP-A-54-16398 discloses a method comprising adding and mixing hydrochloric acid or aluminum chloride and a small amount of a silica-containing material in aluminum hydroxide which is obtained by the Bayer process, calcining the mixture, and then separating alumina from the silica-containing material.

However, an α-alumina powder produced by the above conventional methods still contain about 400 to 100 ppm of sodium (0.04 to 0.01 wt. % in terms of $Na_2O$) even after the treatment for removing sodium, and is not necessarily satisfactory for some applications. Further, in the above methods, it is difficult to remove other impurities such as calcium or iron which will cause abnormal grain growth during sintering of the alumina powder.

In addition, since the α-alumina particles produced by such methods have irregular shapes and the α-alumina powder contains many coarse agglomerated particles, they are deagglomerated with a ball mill or a vibration mill to obtain a final product according to the final use. However, deagglomeration of the α-alumina is not necessarily easy, the deagglomeration is costly, and a long time is consumed for deagglomeration. Therefore, fine particles are generated to widen a particle size distribution, or contamination with impurities decreases a purity of α-alumina.

U.S. Pat. No. 3,175,883 discloses a method comprising calcining aluminum hydroxide at a temperature of 1000° C. or higher in the presence of a chlorine gas and aluminum trifluoride for removing sodium and controlling the primary particle size of α-alumina at the same time. A content of sodium in α-alumina which is obtained by this method is decreased to 30 wt. % or less of the sodium content in aluminum hydroxide as the raw material. But, this method cannot produce α-alumina containing 100 ppm or less of sodium U.S. Pat. No. 3,532,460 discloses a method for producing alumina containing a decreased amount of impurities comprising calcining transition alumina which is contaminated with an oxide of gallium, iron, zinc, calcium, manganese, copper or sodium to adjust a water content to 2 to 6 wt. % and a specific surface area in a range between 40 and 120 $m^2/g$, and contacting the alumina with a chlorine gas in an oxygen free atmosphere at a temperature of 800 to 1000° C., followed by washing with water and heat treatment. However, the alumina obtained by this method is the transition alumina. While the iron content in the alumina can be greatly decreased by the treatment in the chlorine gas atmosphere, and the contents of sodium and calcium are decreased by the washing with water and heat treatment after the treatment in the chlorine gas atmosphere, this process produces only a transition alumina but cannot produce high purity alumina containing 100 ppm or less of each of sodium and calcium.

JP-A-64-3008 discloses a method for producing easily deagglomerated alumina powder comprising applying mechanical impact on aluminum hydroxide or transition alumina having an average secondary particle size of 10 μm or less which is obtained by the Bayer process, and calcining aluminum hydroxide or transition alumina in the presence of a chlorine-containing compound. However, the disclosed method produces an α-alumina powder by suspending aluminum hydroxide as the raw material in hydrochloric acid, drying it and then calcining it, but cannot produce high purity α-alumina containing 100 ppm or less of sodium.

SUMMARY OF THE INVENTION

An object of the present invention is to provide a method for producing a high purity powdery α-alumina having low contents of sodium and iron.

According to a first aspect of the present invention, there is provided a method for producing α-alumina comprising grinding aluminum hydroxide which is produced by the Bayer process or a transition alumina which is obtained by precalcining aluminum hydroxide produced by the Bayer process, and calcining said aluminum hydroxide or transition alumina in an atmosphere containing at least 1 vol. % of a hydrogen chloride gas, or an atmosphere containing at least 1 vol. % of a chlorine gas and at least 0.1 vol. % of steam, at a temperature of 600 to 1400° C.

According to a second aspect of the present invention, there is provided powdery α-alumina having an alumina purity of at least 99.8 wt. %, a sodium content of 40 ppm or less and an iron content of 20 ppm or less, which is obtained by grinding aluminum hydroxide which is produced by the Bayer process or a transition alumina which is obtained by precalcining aluminum hydroxide produced by the Bayer process, and calcining said aluminum hydroxide or transition alumina in an atmosphere containing at least 1 vol. % of a hydrogen chloride gas, or an atmosphere containing at least 1 vol. % of a chlorine gas and at least 0.1 vol. % of steam, at a temperature of 600 to 1400° C.

DETAILED DESCRIPTION OF THE INVENTION

In the method of the present invention, aluminum hydroxide which is produced by the Bayer process, or a transition alumina which is obtained by precalcining aluminum hydroxide produced by the Bayer process is used as a raw material. This aluminum hydroxide and transition alumina will be abbreviated as "aluminum hydroxide by the Bayer process and so on".

Aluminum hydroxide produced by the Bayer process comprises secondary particles having an average particle size of 10 to 100 μm which are formed from agglomerated primary particles having a particle size of at least 1 μm, preferably at least 10 μm. This aluminum hydroxide contains at least 200 ppm of sodium, usually 500 to 2000 ppm of sodium, at least 10 ppm of calcium, usually 50 to 500 ppm of calcium, and at least 20 ppm of iron, usually 50 to 200 ppm of iron.

In the method of the present invention, the aluminum hydroxide by the Bayer process and so on are ground prior to calcination, and then calcined in an atmosphere containing at least 1 vol. % of a hydrogen chloride gas, or an atmosphere containing at least 1 vol. % of a chlorine gas and at least 0.1 vol. % of steam, at a temperature of 600 to 1400° C., preferably 800 to 1200° C.

According to the present invention, high purity powdery α-alumina having a sodium content of 40 ppm or less and an iron content of 20 ppm or less is obtained.

When it is desired to produce a high purity powdery α-alumina having a sodium content of 40 ppm or less, an iron content of 20 ppm or less and a calcium content of 40 ppm or less, preferably each of the sodium, iron and calcium content of 10 ppm or less by the method of the present invention, the produced powdery α-alumina is preferably washed in addition to the grinding of the aluminum hydroxide by the Bayer process and so on, and the calcination under the above conditions.

Since the aluminum hydroxide by the Bayer process and so on are ground prior to calcination, the powdery α-alumina comprising fine particles having a primary particle size of 0.1 to 2 μm is obtained.

The primary particle size of the α-alumina can be controlled by the addition of a seed crystal to the aluminum hydroxide and so on in the calcination step.

The seed crystal is intended to mean a crystal which functions as a growing site for the crystal growth of α-alumina. Any seed crystal can be used so long as α-alumina particle can grow around it. Specific examples of the seed crystal are compounds such as oxides, nitrides, oxynitrides, carbides, carbonitrides and halides of aluminum, titanium, vanadium, chromium, iron, nickel, etc.

The particle size of the aluminum hydroxide by the Bayer process and so on after grinding is not limited, since it depends on the particle size of the aluminum hydroxide by the Bayer process and so on to be used as the raw materials. Preferably, a 50% diameter ($D_{50}$) in a cumulative particle size distribution (i.e. an average secondary particle diameter) is 10 μm or less, more preferably 5 μm or less. Most preferably, when the aluminum hydroxide by the Bayer process and so on are ground to an extent that no primary particle of the aluminum hydroxide and so on remains, higher purity powdery α-alumina can be obtained.

A method for grinding the aluminum hydroxide by the Bayer process and so on is not limited. For example, an industrially employed grinding method using a vibration mill or a ball mill can be employed in the method of the present invention. In the grinding step, dry grinding, wet grinding or a combination thereof may be used.

As a grinding vessel and milling balls which are used for grinding the aluminum hydroxide by the Bayer process and so on, those made of alumina, zirconia or a resin can be used. It is desired to suppress contamination of the aluminum hydroxide by the Bayer process and so on with sodium, iron or calcium as much as possible during grinding.

As such grinding method, there is exemplified a grinding method using a grinding vessel made of a resin or alumina, and milling balls made of zirconia, alumina or a resin. Such grinding method is particularly useful when the production of the highest purity α-alumina is desired.

If necessary, the ground aluminum hydroxide by the Bayer process and so on may be classified or sieved prior to calcination. For example, when ground aluminum hydroxide contains unground primary particles or has a wide particle size distribution, the coarse particles can be removed or the particle size distribution is adjusted to the desired range before the ground aluminum hydroxide is calcined. Such classification or sieving is preferred to obtain the high purity powdery α-alumiina.

A method for classification is not limited. For example, industrially used wet classification or dry classification may be used.

The ground aluminum hydroxide by the Bayer process and so on are calcined in an atmosphere containing at least 1 vol. %, preferably at least 5 vol. %, more preferably at least 10 vol. % of the hydrogen chloride gas. An upper limit of the concentration of the hydrogen chloride gas is not limited. From the industrial view point, the concentration of the hydrogen chloride is preferably 80 vol. % or less, more preferably 50 vol. % or less, most preferably 40 vol. % or less.

As a gas for diluting the hydrogen chloride gas, an inert gas such as argon, etc., nitrogen, hydrogen, an air or a mixture thereof may be used.

Alternatively, the ground aluminum hydroxide by the Bayer process and so on are calcined in an atmosphere containing at least 1 vol. %, preferably at least 5 vol. %, more preferably at least 10 vol. % of the chlorine gas, and at least 0.1 vol. %, preferably at least 1 vol. %, more preferably at least 5 vol. % of steam. Upper limits of the concentrations of the chlorine gas and steam are not limited. From the industrial view point, the concentration of the chlorine gas is preferably 70 vol. % or less, more preferably 50 vol. % or less, most preferably 40 vol. % or less.

As a gas for diluting the chlorine gas and steam, an inert gas such as argon, etc., nitrogen, hydrogen, an air or a mixture thereof may be used.

A pressure of the atmosphere in which the calcination is performed is not limited, and selected from the industrially used pressure range.

The calcination of the aluminum hydroxide by the Bayer process and so on in such atmosphere can provide the high purity powdery α-alumina of the present invention at a relatively low calcination temperature.

The calcination temperature is usually from 600 to 1400° C., preferably from 800 to 1200° C. When the calcination is performed in this temperature range, α-alumina is formed at an industrially advantageous rate, and the formed α-alumina particles are less agglomerated each other, so that the powdery α-alumina has a narrow particle size distribution even just after the calcination.

Accordingly, one of the characteristics of the present invention is that α-alumina can be obtained at a lower calcination temperature than the calcination temperature used in the conventional methods.

An adequate calcination time depends on the concentration of the hydrogen chloride gas or the chlorine gas and steam in the atmosphere, and the calcination temperature, and is not limited specifically. The calcination time is preferably at least one minute, more preferably at least 10 minutes. The aluminum hydroxide by the Bayer process and so on are calcined until crystals of the α-alumina particles grow. According to the method of the present invention, the intended powdery α-alumina can be obtained in a shorter calcination time than in the conventional methods.

A supply source and method of the atmosphere gas are not limited. Any supply source and method can be used so long as the above atmosphere gas can be supplied in a reaction system containing the aluminum hydroxide by the Bayer process and so on.

A type of a calcining apparatus is not limited, and a so-called calcining furnace is preferably used. The calcining furnace is preferably made of a material which is not corroded by the hydrogen chloride gas or the chlorine gas, and has a mechanism for adjusting the atmosphere.

Since the acidic gas such as the hydrogen chloride gas or the chlorine gas is used, the furnace is preferably an airtight one.

The calcination is performed preferably in a continuous manner in the industrial production, and then a tunnel furnace, a rotary kiln, and the like may be preferably used.

An apparatus used in the method of the present invention such as a crucible or a boat is preferably made of alumina, quartz, acid-resistant brick or graphite since the α-alumina particles grow in the corrosive gas atmosphere.

The contents of sodium and iron in the powdery α-alumina produced by the above method are reduced to 40 ppm or less of sodium and 20 ppm or less of iron, preferably 10 ppm or less of sodium and 10 ppm or less of iron, since the aluminum hydroxide by the Bayer process and so on are calcined in the atmosphere containing the hydrogen chloride gas, or the chlorine gas and steam.

After the calcination in the above atmosphere, the powdery α-alumina produced by the method of the present invention may contain a minor amount of residual sodium or a relatively large amount of calcium as an impurity depending on the calcium content in the aluminum hydroxide by the Bayer process and so on which are used as the raw materials. When the powdery α-alumina containing the large amount of calcium is sintered, abnormal grain growth occurs mainly because of the presence of calcium so that properties of the sintered body such as strength are deteriorated. For such application, the α-alumina powder containing less calcium is required.

To decrease the calcium content in the powdery α-alumina, the powdery α-alumina is washed with a solvent after the calcination. The washing of the powdery α-alumina with a solvent is particularly preferred to obtain the higher purity powdery α-alumina having the calcium content of 40 ppm or less. That is, washing with the solvent can decrease the calcium content in the powdery α-alumina to 40 ppm or less, preferably 10 ppm or less.

A washing method is not limited. Preferably, the powdery α-alumina is washed with a solvent in which sodium or calcium components contained in the powdery α-alumina are dissolved, such as water.

For example, the powdery α-alumina obtained by calcination is charged in water kept at a temperature of room temperature to 100° C. and stirred, whereby the sodium and calcium components are leached, and then the powder is recovered by filtration and again washed with water. Preferably, washing is performed until no chlorine ion is detected when an aqueous solution of silver nitride is dropped in waste water and the occurrence of white clouding of the waste water is not observed.

According to the method of the present invention, the high purity powdery alumina having an alumina purity of at least 99.8 wt. %, usually at least 99.9 wt. % is obtained using the economical aluminum hydroxide by the Bayer process and so on as the raw materials.

Sometimes, the powdery α-alumina produced by the method of the present invention may contain a slight amount of agglomerated particles. A degree of agglomeration is weak, and the agglomerated particles can be easily deagglomerated to obtain the powdery α-alumina containing few agglomerated particles and having the narrow particle size distribution.

The powdery α-alumina having the narrow particle size distribution is intended to mean that $D_{90}/D_{10}$ is small, preferably 15 or smaller, more preferably 10 or smaller, most preferably 5 or smaller, wherein $D_{10}$ and $D_{90}$ represent a cumulative 10% diameter and a cumulative 90% diameter, respectively from the smallest particle size in a cumulative particle size distribution.

Using the powdery α-alumina which is prepared by the method of the present invention as a raw material, a sintered body having a high density of 3.8 g/cm³ can be produced.

A sintering method is not limited. For example, the powdery α-alumina is washed with a solvent such as water, if necessary, and simply deagglomerated by dry or wet deagglomeration to obtain the powdery α-alumina having a narrower particle size distribution. Then, the powdery α-alumina is molded by any of conventional molding methods such as press molding, slip cast molding, and so on, to obtain a molded body, and sintered in an air at a temperature of 1400 to 1700° C.

EXAMPLES

The present invention will be illustrated by the following Examples, which do not limit the scope of the present invention in any way.

In the Examples, the properties are measured as follows:

1. Measurement of a Cumulative Particle Size Distribution ($D_{90}/D_{10}$) and $D_{50}$ of Aluminum Hydroxide Produced by the Bayer Process and Powdery α-Alumina, and Average Primary Particle Size of α-Alumina (1) The $D_{90}/D_{10}$ ratio and $D_{50}$ are measured by a "Master Sizer (manufactured by Malvern Instrument, Inc.) which uses a laser beam scattering method as a measurement principle.

(2) The number average primary particle size is obtained by selecting 50 to 100 particles from a scanning electron microscopic photograph of the α-alumina taken by the scanning electron microscope (T-220 manufactured by Nippon Electron Co., Ltd.) and image analyzing them to calculate an average value of equivalent circle diameters of the particles and the distribution. The equivalent circle diameter was a diameter of a circle having the same area as that of the particle.

2. Measurement of Purity of Alumina

Amounts of ions of silicon, iron, titanium, magnesium, sodium, calcium, potassium, zirconium and yttrium which are impurity ions by emission spectroscopic analysis, and their amounts are converted to amounts of their oxides. Then, a total percentage (wt. %) of the oxides is subtracted from 100 wt. %, and a result is used as a purity of alumina.

The aluminum hydroxide raw materials produced by the Bayer process and used in the Examples were as follows:

1. Aluminum Hydroxide A

Aluminum hydroxide having a primary particle size of about 5 to 20 μm, a cumulative 50% diameter ($D_{50}$) in a cumulative particle size distribution of 17 μm, a sodium content of 830 ppm, a calcium content of 190 ppm, and an iron content of 62 ppm.

2. Aluminum Hydroxide B

Aluminum hydroxide having a primary particle size of about 5 to 20 μm, a cumulative 50% diameter ($D_{50}$) in a cumulative particle size distribution of 38 μm, a sodium content of 1000 ppm, a calcium content of 90 ppm, and an iron content of 26 ppm.

3. Aluminum Hydroxide C

Aluminum hydroxide having a primary particle size of about 1 to 5 μm, a cumulative 50% diameter ($D_{50}$) in a cumulative particle size distribution of 11 μm, a sodium content of 670 ppm, a calcium content of 58 ppm, and an iron content of 39 ppm.

The grinding methods used for grinding the aluminum hydroxide produced by the Bayer process were as follows:

1. Grinding Method A

In a 2 liter alumina pot (HD Pot Mill B type manufactured by NIKKATO), 50 g of aluminum hydroxide which had been dried at 130° C. and 1800 g of alumina balls (HD Alumina Ball manufactured by NIKKATO, a diameter of 15 mm) were introduced and milled with a vibration mill (Vibro-Pot manufactured by Yasukawa Electric Manufacturing Co., Ltd.) with an amplitude of ±4 mm for 2 hours.

2. Grinding Method B

In the same alumina pot as used above, 50 g of aluminum hydroxide which had been dried at 130° C. and 3000 g of zirconia balls (YTZ Ball manufactured by NIKKATO, a diameter of 15 mm) were introduced and milled with the same vibration mill as used above with an amplitude of ±4 mm for 30 minutes. Then, 25 g of the milled aluminum hydroxide, 150 g of distilled water and 1200 g of the zirconia balls were introduced in a polyethylene one liter pot and ground by ball milling at a rotation rate of 60 rpm for 12 hours, followed by drying at 130° C.

3. Grinding Method C

In the same alumina pot as used above, 90 g of aluminum hydroxide which had been dried at 130° C. and 1800 g of the alumina balls were introduced and milled by ball milling at 60 rpm for 6 hours. Since the ground aluminum hydroxide contained unground particles, it was wet classified to remove the unground primary particles of aluminum hydroxide, whereby the particle size of aluminum hydroxide was adjusted to 10 μm or less.

4. Grinding Method D

In a one liter polyethylene pot, 25 g of aluminum hydroxide, 0.14 g of α-alumina (AKP-50 manufactured by Sumitomo Chemical Co., Ltd. a primary particle size of 0.2 μm) as a seed crystal and 1000 g of the zirconia balls were charged and milled by ball milling at 60 rpm for 6 hours, followed by drying at 130° C.

As a hydrogen chloride gas, a bomb hydrogen chloride gas (supplied by Tsurumi Soda Co., Ltd. purity of 99.9%) was used.

The calcining procedures were as follows:

The aluminum hydroxide A or B was charged in an alumina boat, or the aluminum hydroxide C was charged in an platinum vessel, and then a platinum lid was put on the platinum vessel.

A charged amount of each aluminum hydroxide was 3 to 35 g, and a charging depth was about 10 to 15 mm.

The aluminum hydroxide was calcined using a cylindrical furnace having a quartz muffle with a diameter of 58 mm and a length of 1200 mm (manufactured by MOTOYAMA Co., Ltd.), at a heating rate of 10° C./min. up to 900° C. and then at 5° C./min. up to 1100° C.

A concentration of the atmosphere gas was adjusted by controlling a flow rate with a flow meter. A nitrogen gas was used to dilute the hydrogen chloride gas, and a flow rate of the atmosphere gas was adjusted to a linear speed of 10 cm/min. The atmosphere gas was flowed from the room temperature.

After the furnace was heated to the specified temperature, it was maintained at that temperature for a specified period of time. This temperature and time are referred to as a maintaining temperature (calcination temperature) and a maintaining time (calcination time), respectively. After the specified maintaining time, only the nitrogen gas was flowed to cool the furnace, whereby a powdery α-alumina was obtained in the alumina boat or the platinum vessel in which the raw material aluminum hydroxide was charged.

In Comparative Examples 2 and 3, the raw material aluminum hydroxide (about 10 g) was charged in an aluminum crucible and calcined at 130° C. in an air.

The washing methods of the powdery α-alumina obtained by calcination were as follows:

1. Washing Method A

The powdery α-alumina (about 20 g) was poured in distilled water (about 80 g) and stirred at room temperature for 30 minutes, and filtrated. Then, the α-alumina was further washed with distilled water twice, and dried at 130° C.

2. Washing Method B

The powdery α-alumina (about 5 to 10 g) was poured in distilled water (about 500 g) and stirred at 80° C. for 30 minutes, and filtrated. Then, the powdery α-alumina was further washed with distilled water warmed to 80° C. until no chlorine ion was detected when an aqueous solution of silver nitride was dropped in waste water, and then dried at 130° C.

After a part of the powdery α-alumina was deagglomerated and subjected to the measurement of particle size distribution, it was slip cast molded and sintered at 1600° C. for 2 hours. A density of the sintered body was measured by the Archimedes' method. Thereafter, a surface of the sintered body was mirror polished, and particle sizes in the sintered body was measured using a scanning electron microscope.

The deagglomerating methods used for deagglomeration of the powdery α-alumina were as follows:

1. Deagglomerating Method X

In a one liter polyethylene pot, the powdery α-alumina obtained by calcination (about 20 g) and zirconia balls each having a diameter of 15 mm (1000 g) were introduced, and ground by dry ball milling at 80 rpm for 6 hours.

2. Deagglomerating Method Y

In a one liter polyethylene pot, the powdery α-alumina obtained by calcination (about 20 g), zirconia balls each having a diameter of 15 mm (1000 g) and distilled water (80 g) were introduced, and ground by wet ball milling at 80 rpm for 6 hours. Thereafter, a slurry containing the α-alumina was filtrated, and washed with distilled water twice, followed by drying at 130° C.

3. Deagglomerating Method Z

In a 500 ml polyethylene pot, the powdery α-alumina washed by the washing method B (5 g) and zirconia balls each having a diameter of 5 mm (1000 g) were introduced, and ground by dry ball milling at 80 rpm for 6 hours.

The slip cast molding was performed by mixing the powdery α-alumina after grinding (15 g) with distilled water (10.5 g) and a dispersant (SN Dispersant 5468 manufactured by SUNNOPCO) (0.18 g), dispersing the mixture by applying ultrasonic wave for 30 minutes, and then pouring the mixture in a gypsum mold.

Examples 1–4

The aluminum hydroxide A or B produced by the Bayer process was ground and then calcined in the atmosphere of hydrogen chloride gas.

The kinds of the raw material, the grinding conditions, the particle sizes of the raw material, the calcining conditions, etc. and the properties of the powdery α-alumina are summarized in Tables 1 and 2.

Example 5

The powdery α-alumina obtained in Example 1 was further washed. The kinds of the raw material, the grinding conditions, the particle sizes, the calcining conditions, etc. and the properties of the powdery α-alumina are summarized in Tables 1 and 2.

Example 6

The powdery α-alumina obtained in Example 4 was further washed. The kinds of the raw material, the grinding conditions, the particle sizes, the calcining conditions, etc. and the properties of the powdery α-alumina are summarized in Tables 1 and 2.

Example 7

The aluminum hydroxide C produced by the Bayer process was ground and then calcined in the atmosphere of hydrogen chloride gas, and the powdery α-alumina was further washed. The kinds of the raw material, the grinding conditions, the particle sizes, the calcining conditions, etc. and the properties of the powdery α-alumina are summarized in Tables 1 and 2.

Example 8

The powdery α-alumina obtained in Example 1 was dry deagglomerated, slip cast molded and sintered at 1600° C.

After calcination, the powdery α-alumina had an average primary particle size of 0.7 μm and a $D_{90}/D_{10}$ ratio of 10.2, and contained a small amount of agglomerated particles. Since the degree of agglomeration was slight, the powdery α-alumina was dry deagglomerated to give a narrow particle size distribution with a $D_{90}/D_{10}$ of 4.0.

The dry deagglomerated powdery α-alumina was sintered at 1600° C. to compact it to a density of 3.92 g/cm$^3$, but a content of calcium therein was as high as 280 ppm, and abnormal grain growth was observed in the sintered body.

The properties of the powdery α-alumina after deagglomeration and the sintered body are summarized in Table 3.

Example 9

The powdery α-alumina obtained in Example 1 was wet deagglomerated, washed with water, slip cast molded, and sintered at 1600° C.

After calcination, the powdery α-alumina had an average primary particle size of 0.7 μm and a $D_{90}/D_{10}$ ratio of 10.2, and contained a small amount of agglomerated particles. Since the degree of agglomeration was slight, the powdery α-alumina was wet deagglomerated to give a narrow particle size distribution with a $D_{90}/D_{10}$ of 4.3.

The wet deagglomerated powdery α-alumina was sintered at 1600° C. to compact it to a density of 3.85 g/cm$^3$. A content of calcium therein was as low as 23 ppm, and no abnormal grain growth was observed in the sintered body.

The properties of the powdery α-alumina after deagglomeration and the sintered body are summarized in Table 3.

Example 10

The powdery α-alumina obtained in Example 7 was dry deagglomerated, slip cast molded, and sintered at 1600° C.

After calcination, the powdery α-alumina had an average primary particle size of 0.6 μm and a $D_{90}/D_{10}$ ratio of 8.1, and contained a small amount of agglomerated particles. Since the degree of agglomeration was slight, the powdery α-alumina was dry deagglomerated to give a narrow particle size distribution with a $D_{90}/D_{10}$ of 3.6.

The dry deagglomerated powdery α-alumina was sintered at 1600° C. to compact it to a density of 3.98 g/cm$^3$. A content of calcium therein was as low as 9 ppm, and no abnormal grain growth was observed in the sintered body.

The properties of the powdery α-alumina after grinding and the sintered body are summarized in Table 3.

Comparative Examples 1–3

The aluminum hydroxide A or C produced by the Bayer process was calcined in the air according to the conventional method.

The kinds of the raw material, the particle sizes, the calcining conditions, and the properties of the powdery α-alumina are summarized in Tables 1 and 2.

The obtained powdery α-alumina contained the κ phase, the δ phase, and so on in addition to the α phase when the calcination was performed at 1100° C., and no single phase α-alumina powder was obtained (Comparative Example 1).

When the calcination was performed at 1300° C., the obtained powdery α-alumina consisted of firmly bonded α-alumina particles having a primary particle size of about 0.2 μm, and the calcination in the air could not reduce the contents of the impurities (Comparative Examples 2 and 3).

Comparative Example 4

The aluminum hydroxide A produced by the Bayer process was calcined in the atmosphere of hydrogen chloride without pregrinding or post washing.

The obtained powdery α-alumina had an average primary particle size of 2.2 μm, and the content of sodium was decreased only to 60 ppm.

The kinds of the raw material, the grinding conditions, the particle sizes, the calcining conditions, etc. and the properties of the powdery α-alumina are summarized in Tables 1 and 2.

Comparative Example 5

The powdery α-alumina, which was obtained in the same manner as in Comparative Example 4 except the maintaining time in the calcination was changed to 30 minutes, was wet deagglomerated, slip cast molded and sintered at 1600° C.

The obtained powdery α-alumina had an average primary particle size of 2.2 μm and a $D_{90}/D_{10}$ ratio of 7.9 after wet deagglomeration, which indicated a slightly broad particle size distribution. The contents of sodium and calcium were both larger than 40 ppm.

When the powdery α-alumina which was washed after wet grinding was sintered at 1600° C., it was compacted only to 3.24 g/cm$^3$.

The properties of the powdery α-alumina after deagglomeration and the sintered body are summarized in Table 3.

TABLE 1

| | Raw material | | | Calcining conditions | | | Washing |
|---|---|---|---|---|---|---|---|
| Ex. No. | Aluminum hydroxide | Grinding method | $D_{50}$ (μm) | HCl gas (vol. %) | Maintaining temp. (° C.) | Maintaining time (min.) | method of calcined powder |
| 1 | A | A | 4.4 | 30 | 1100 | 30 | None |
| 2 | A | B | 2.4 | 30 | 1100 | 30 | None |
| 3 | A | C | 2.3 | 30 | 1100 | 30 | None |
| 4 | B | A | 4.7 | 30 | 1100 | 30 | None |
| 5 | A | A | 4.4 | 30 | 1100 | 30 | A |
| 6 | B | A | 4.7 | 30 | 1100 | 30 | A |
| 7 | C | D | 2.9 | 30 | 1100 | 30 | B |
| C. 1 | A | — | 17 | in air | 1100 | 30 | None |
| C. 2 | A | — | 17 | in air | 1300 | 30 | None |
| C. 3 | C | — | 11 | in air | 1300 | 30 | None |
| C. 4 | A | — | 17 | 30 | 1100 | 180 | None |

TABLE 2

| Ex. No. | Av. primary particle size of α-alumina (μm) | $D_{50}$ (μm) | $D_{90}/D_{10}$ | Alumina purity (wt. %) | Sodium content (ppm) | Calcium content (ppm) | Iron content (ppm) |
|---|---|---|---|---|---|---|---|
| 1 | 0.7 | 3.1 | 10.2 | 99.92 | 18 | 280 | 14 |
| 2 | 0.5 | 1.7 | 5.4 | 99.85 | 4 | 330 | 8 |
| 3 | 0.5 | 1.9 | 6.8 | 99.92 | <2 | 230 | 2 |
| 4 | 1.0 | 3.2 | 8.7 | 99.97 | 15 | 73 | 5 |
| 5 | 0.7 | 3.1 | 10.2 | 99.98 | 24 | 23 | 12 |
| 6 | 1.0 | 3.2 | 8.7 | 99.98 | 12 | 6 | 5 |
| 7 | 0.6 | 2.5 | 8.1 | 99.97 | 2 | 9 | 6 |
| C. 1 | — | — | — | 99.75 | 1260 | 290 | 94 |
| C. 2 | ca. 0.2 | 17.8 | 38.9 | 99.69 | 1800 | 240 | 74 |
| C. 3 | ca. 0.2 | 9.8 | 12.8 | 99.87 | 790 | 76 | 47 |
| C. 4 | 2.2 | 11 | 8.2 | 99.95 | 62 | 120 | 4 |

TABLE 3

| | Powdery α-alumina used in sintering after deagglomeration | | | | | | Results of sintering at 1600° C. | |
|---|---|---|---|---|---|---|---|---|
| Ex. No. | Grinding method | Ave. Primary particle size of α-alumina (μm) | $D_{50}$ (μm) | $D_{90}/D_{10}$ | Na content (ppm) | Ca content (ppm) | Density of sintered body (g/cm$^3$) | Particle size of sintered body (μm) |
| 8 | A | 0.7 | 1.1 | 4.0 | 18 | 280 | 3.92 | ca. 100 |
| 9 | B | 0.7 | 1.3 | 4.3 | 24 | 23 | 3.85 | ca. 2 |
| 10 | C | 0.6 | 0.6 | 3.6 | 2 | 9 | 3.98 | ca. 5 |
| C. 5 | B | 2.2 | 2.9 | 7.9 | 48 | 40 | 3.24 | ca. 3 |

According to the method for producing α-alumina of the present invention, powdery α-alumina consisting of α-alumina particles having the alumina purity which is higher than the purity of conventional low soda alumina and containing reduced amounts of sodium, iron and calcium can be easily obtained at a low cost using, as a raw material, cheap aluminum hydroxide produced by the Bayer process or a transition alumina obtained by precalcining aluminum hydroxide produced by the Bayer process which contains large amounts of sodium, iron and calcium.

When the high purity powdery α-alumina of the present invention is used as an electrical insulating material of a spark plug or an IC substrate, improvement of the electrical insulation properties of the electrical insulation material is expected. Since the α-alumina particles of the powdery α-alumina of the present invention are weakly agglomerated, they can be easily deagglomerated by ball milling, a jet mill and so on, and the deagglomerated powdery α-alumina has a narrow particle size distribution, and is suitably used as an abrasive and a raw material of a sintered body.

What is claimed is:

1. A method for producing α-alumina having an alumina purity of at least 99.9%, a sodium content of 40 ppm or less, an iron content of 20 ppm or less and a calcium content of 40 ppm or less comprising the steps of:
   (i) grinding aluminum hydroxide which is produced by the Bayer process or grinding a transition alumina which is obtained by calcining aluminum hydroxide produced by the Bayer process so that the aluminum hydroxide or transition alumina has a 50% diameter ($D_{50}$) in a cumulative particle size distribution of 10 μm or less,
   (ii) calcining the ground aluminum hydroxide or transition alumina in an atmosphere containing at least 10 vol. % of a hydrogen chloride gas, or an atmosphere containing at least 10 vol. % of a chlorine gas and at least 5 vol. % of steam, at a temperature of 600 to 1400° C. to form α-alumina; wherein the amount of sodium is reduced to 40 ppm or less and the amount of iron is reduced to 20 ppm or less in the α-alumina formed; and
   (iii) washing the α-alumina with water; wherein the amount of calcium is reduced to 40 ppm or less.

2. The method according to claim 1, wherein said aluminum hydroxide or said transition alumina is ground so that a 50% diameter ($D_{50}$) in a cumulative particle size distribution is 5 μm or less.

3. The method according to claim 1, wherein a calcining temperature is from 800 to 1200° C.

4. A method for producing α-alumina having an alumina purity of at least 99.9%, a sodium content of 10 ppm or less, an iron content of 10 ppm or less and a calcium content of 10 ppm or less comprising the steps of
   (i) grinding aluminum hydroxide which is produced by the Bayer process or grinding a transition alumina which is obtained by calcining aluminum hydroxide produced by the Bayer process so that the aluminum hydroxide or transition alumina has a 50% diameter ($D_{50}$) in a cumulative particle size distribution of 5 μm or less, (ii) calcining the ground aluminum hydroxide or transition alumina in an atmosphere containing at least 10 vol. % of a hydrogen chloride gas, or an atmosphere containing at least 10 vol. % of a chloride gas and at least 5 vol. % of steam, at a temperature of 600 to 1400° C. to form α-alumina; whereby the amount of sodium is reduced to 10 ppm or less and the amount of iron is reduced to 10 ppm or less in the α-alumina formed; and (iii) washing the α-alumina with water; wherein the amount of calcium is reduced to 10 ppm or less.

* * * * *